United States Patent
Ranalli et al.

(10) Patent No.: US 7,396,374 B2
(45) Date of Patent: Jul. 8, 2008

(54) CONTROLLED FLOW GREASE FILTER FOR DOMESTIC EXTRACTOR HOODS

(75) Inventors: Antonio Ranalli, Scerni (IT); Matteo Tarantini, Corato (IT)

(73) Assignee: Elica S.p.A., Fabriano (IT)

( * ) Notice: Subject to any disclaimer, the term of this patent is extended or adjusted under 35 U.S.C. 154(b) by 572 days.

(21) Appl. No.: 11/122,952

(22) Filed: May 5, 2005

(65) Prior Publication Data

US 2005/0252181 A1 Nov. 17, 2005

(30) Foreign Application Priority Data

May 6, 2004 (IT) .......................... RN2004A0028

(51) Int. Cl.
*B01D 45/00* (2006.01)
(52) U.S. Cl. .................... 55/445; 55/DIG. 36
(58) Field of Classification Search ............... 55/443, 55/444, 445, 446, DIG. 36
See application file for complete search history.

(56) References Cited

U.S. PATENT DOCUMENTS 2,827,126 A 3/1958 Mazur
4,105,422 A 8/1978 Kiguchi

FOREIGN PATENT DOCUMENTS

| IT | RN2002U0020 | 4/2004 |
| JP | 11051435 | 2/1999 |
| JP | 2000093722 A * | 4/2000 |

* cited by examiner

*Primary Examiner*—Robert A Hopkins
(74) *Attorney, Agent, or Firm*—Pearne & Gordon LLP

(57) ABSTRACT

A grease filter (1) for domestic extractor hoods comprises at least two walls (2, 3) placed face to face and having first through openings (4) made in them arranged in such a way as to cause sudden changes of direction in the fumes flowing through them. At least one of the walls (2, 3) includes a plurality of second openings (5) whose flow section is considerably narrower than that of the first openings (4). The first openings (4) and the second openings (5) combine to divide the total flow passing through the filter (1) into two component flows which are in turn divided into a first plurality of macroscopic flows (6) following a labyrinth path through the first openings (4) and a second plurality of microscopic flows (7) passing through the second openings (5).

12 Claims, 1 Drawing Sheet

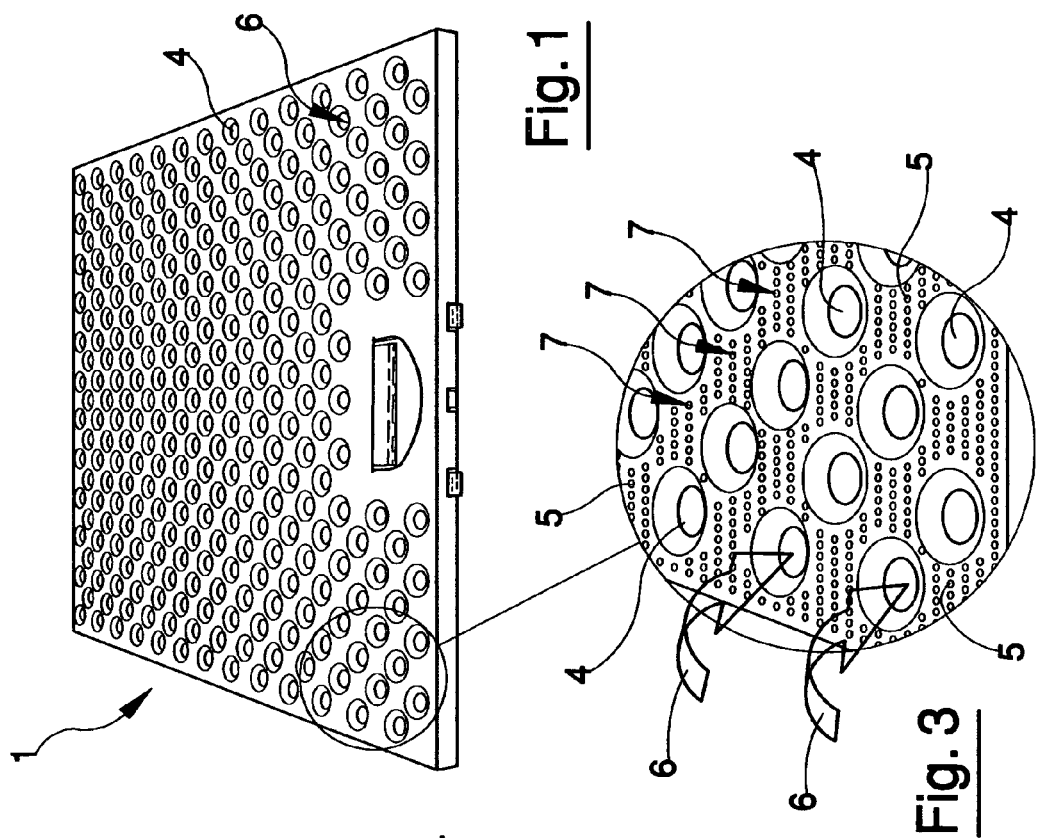
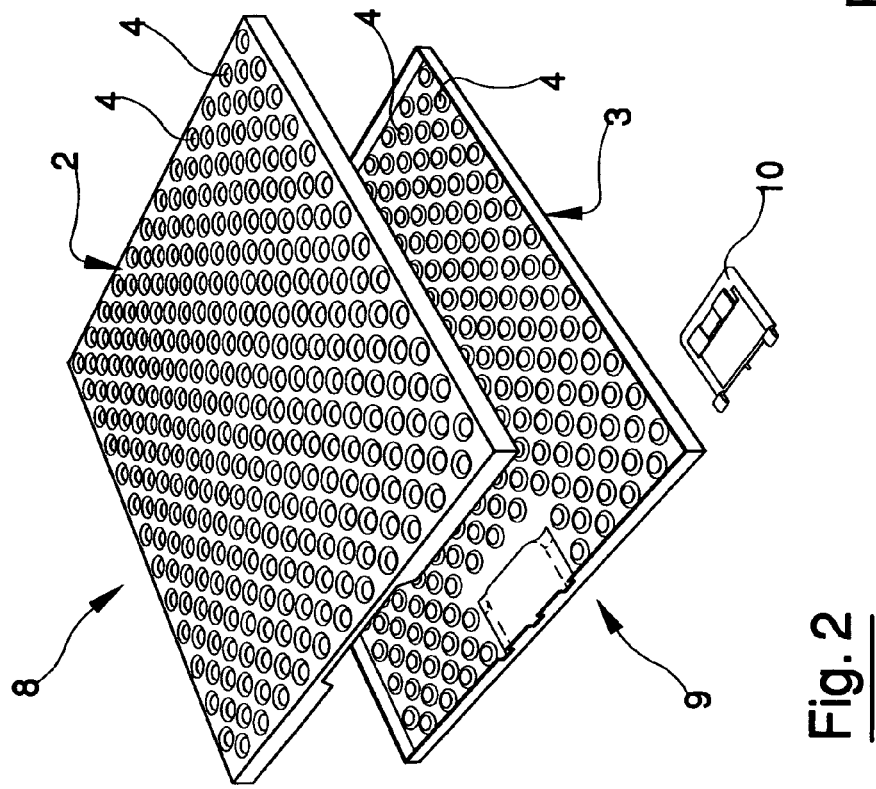

CONTROLLED FLOW GREASE FILTER FOR DOMESTIC EXTRACTOR HOODS

BACKGROUND OF THE INVENTION

The present invention relates to the field of cooking fume extractor hoods for domestic use. The invention relates, in particular, to a controlled flow grease filter for trapping and separating liquid and/or solid particles suspended in the air from fumes sucked in by the extractor hoods.

In order to trap the microscopic particles suspended in the cooking fumes carried by domestic extractor hoods, the hoods are normally fitted with filters. These hood filters may be broadly divided into two main types, according to their constructional design.

In a first type of filter, multi-layered materials such as paper, cellulose or fine-mesh netting are used to trap and hold the liquid droplets or solid particles transported by the flow of fumes flowing through the filter while the part of the fumes constituted by air is allowed to flow through the filter.

The second type of filter comprises labyrinth filters which work on the principle of sudden changes of direction of fume flow. The fumes flowing through the filter are forced to follow a complex path having specially designed twists and turns. The part of the fumes constituted by air easily follows the path and flows out to the other side of the filter, whilst the suspended liquid droplets and solid particles are unable to change their direction suddenly on account of their high inertia and remain trapped inside the filter.

In a prior Italian patent application N. RN2002U000020, the Applicant disclosed a technical solution relating to labyrinth filters for domestic extractor hoods.

That solution, although tested successfully, has one drawback—common to all types of labyrinth filters—and that is, that, in strictly fluid dynamic terms, labyrinth filters can be advantageously used in extractor hoods only if the flow sections are relatively wide. Narrower flow sections reduce the working flow rate of the processed flow and increase flow speed. The former reduces the amount of air processed per unit of time, the latter exponentially increases load losses and significantly increases the noise made by the hood in operation. On the other hand, wider flow sections to improve the fluid dynamic properties of the filter would lead to a lower particle retention efficiency.

The aim of this invention is to overcome the above mentioned typical shortcomings of labyrinth filters by reaching an effective compromise that permits the achievement of a high suspended particle retention efficiency accompanied by low energy load loss and low noise.

SUMMARY OF THE INVENTION

According to the invention, this aim is achieved by a grease filter for domestic extractor hoods, comprising at least two walls placed face to face and having first through openings made in them arranged in such a way as to cause sudden changes of direction in the fumes flowing through them, wherein at least one of these walls includes a plurality of second openings whose flow section is considerably narrower than the flow section of the first openings, the first and second openings combining to divide the total flow passing through the filter into two component flows which are in turn divided into a first plurality of macroscopic flows following a labyrinth path through the first openings and a second plurality of microscopic flows passing through the second openings.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

FIG. 1 is a perspective assembly view of a the filter according to the invention;

FIG. 2 is a perspective, exploded view of the filter of FIG. 1;

FIG. 3 is a scaled-up detail of the Filter of FIG. 1.

DESCRIPTION OF THE PREFERRED EMBODIMENTS

With reference to the accompanying drawings, the numeral 1 in FIG. 1 denotes in its entirety a grease filter for domestic extractor hoods.

The filter 1 essentially comprises three component parts—shown in FIG. 2—consisting in particular of two matching shells 8 and 9 and a hooking device 10.

The shells 8 and 9 are designed to be fitted to each other face to face in such a way as to form a box-shaped body—of a type well known in the trade—that houses the hooking device 10.

The shells 8 and 9 have respective walls 2 and 3 placed face to face and having first through openings 4 made in them, the ones made in the wall 8 being offset from those made in the wall 9 so as to cause sudden changes of direction in the fumes flowing through the filter 1. These changes of direction, as is known, create a labyrinth path suitable for trapping and retaining within the filter 1 the liquid and/or solid particles suspended in the stream of fumes moved by the sucking action of the extractor hood.

As shown in FIG. 3, which is a scaled-up detail from FIG. 1, one of the walls 2 and 3 of the filter 1 is made from a microperforated plate, that is to say, a plate that has made in it a plurality of second openings 5, preferably circular, whose flow section is considerably narrower than the flow section of the first openings 4.

During operation of the filter 1, the first openings 4 and the second openings 5 combine to divide the total flow passing through the filter 1 into two parallel component flows which are in turn divided into a first plurality of macroscopic flows 6 following a labyrinth path through the first openings 4 and a second plurality of microscopic flows 7 passing directly through the narrower second openings 5.

This constructional solution is the result of in-depth studies, including simulations at the computer, and offers the advantage, compared to prior art solutions, of permitting the achievement of a higher particle retention efficiency accompanied by lower energy load loss and lower noise.

It is also interesting to note that the possibility of constructionally varying the ratio of the flow section area of the first openings 4 to that of the second openings 5 and the possibility of varying the number of holes and micropores belonging to the flow sections of the two types of openings allow the performance of the filter 1 to be modulated within a wide range so as to meet a wide range of requirements for the construction of different extractor hood solutions.

In the description of the embodiment illustrated in the accompanying drawings, reference is made to micropores 5 only in one of the two shells 8 and 9. This must not, however, be considered in a restrictive or exclusive sense and it will be understood that the invention can be modified in several ways such as, for example, by making the second openings 5 in both of the walls 2 and 3 placed face to face; and/or making the flow sections of the second openings in one of the shells 8 and 9 equal or different to the flow sections of the second openings in the other. As to their alignment, they may be aligned or transversely offset, both these aspects falling within the general concept of making the flow of fumes passing through the filter more controlled and controllable while maintaining the particle retention efficiency at a high level.

The invention described is suitable for evident industrial applications and may be subject to modifications and variations without thereby departing from the inventive concept. Moreover, all of the details of the invention may be substituted by technically equivalent elements.

What is claimed:

1. A grease filter for domestic extractor hoods, comprising at least two walls (2, 3) placed face to face and having first through openings (4) made in them arranged in such a way as to cause sudden changes of direction in the fumes flowing through them, wherein at least one of these walls (2, 3) includes a plurality of second openings (5) whose flow section is narrower than the flow section of the first openings (4), the first openings (4) and the second openings (5) combining to divide the total flow passing through the filter into two component flows which are in turn divided into a first plurality of macroscopic flows (6) following a labyrinth path through the first openings (4) and a second plurality of microscopic flows (7) passing through the second openings (5).

2. The filter according to claim 1, wherein both the walls (2, 3) placed face to face have made in them the second openings (5) whose flow sections are narrower than the flow sections of the first openings (4).

3. The filter according to claim 1, wherein the second openings (5) take the form of circular holes.

4. The filter according to claim 2, wherein the second openings (5) in the walls (2, 3) placed face to face are aligned with each other.

5. The filter according to claim 2, wherein the second openings (5) in the walls (2, 3) placed face to face are offset from each other.

6. The filter according to claim 2, wherein the second openings (5) in the walls (2, 3) differ in flow section area from one wall (2) to the other (3).

7. The filter according to claim 1, wherein the at least one of the walls (2; 3) with the second openings (5) includes a microperforated plate.

8. The filter according to claim 2, wherein one of the walls (2; 3) with the second openings (5) includes a microperforated plate.

9. The filter according to claim 2, wherein both the walls (2; 3) with the second openings (5) include a microperforated plate.

10. The filter according to claim 7, wherein the plate is made of metal.

11. The filter according to claim 8, wherein the plate is made of metal.

12. The filter according to claim 9, wherein the plate is made of metal.

* * * * *